(12) United States Patent
Barnes

(10) Patent No.: US 12,722,767 B2
(45) Date of Patent: Sep. 1, 2026

(54) AIRCRAFT BODY SECTION WITH MULTILAYER ELECTRICALLY CONDUCTIVE STRUCTURE AND METHODS OF FABRICATION

(71) Applicant: Boeing Ace Collateral Agent, LLC, Arlington, VA (US)

(72) Inventor: Edward Barnes, Palo Alto, CA (US)

(73) Assignee: Boeing Ace Collateral Agent, LLC, Arlington, VA (US)

( * ) Notice: Subject to any disclaimer, the term of this patent is extended or adjusted under 35 U.S.C. 154(b) by 956 days.

(21) Appl. No.: 16/925,425

(22) Filed: Jul. 10, 2020

(65) Prior Publication Data

US 2022/0009613 A1 Jan. 13, 2022

(51) Int. Cl.
*B64C 1/06* (2006.01)
*B29C 70/34* (2006.01)
(Continued)

(52) U.S. Cl.
CPC ............ *B64C 1/068* (2013.01); *B29C 70/342* (2013.01); *B32B 5/02* (2013.01); *B32B 17/02* (2013.01); *B32B 27/12* (2013.01); *B32B 37/10* (2013.01); *B64F 5/10* (2017.01); *B29K 2307/04* (2013.01); *B29K 2309/08* (2013.01);
(Continued)

(58) Field of Classification Search
CPC . B29C 70/202; B29C 70/882; B29K 2307/04; B29K 2309/08; B29L 2031/3076; B29L 2031/3082; B32B 3/266; B32B 5/02; B32B 5/024; B32B 5/26; B32B 5/262; B32B 5/263; B32B 17/02; B32B 27/08; B32B 27/12; B32B 27/18; B32B 27/281; B32B 27/38; B32B 2260/023; B32B 2260/046; B32B 2262/0269; B32B 2262/101; B32B 2262/106; B32B 2307/202; B32B 2457/08; B32B 2605/18; B64C 1/068; B64C 1/12;
(Continued)

(56) References Cited

U.S. PATENT DOCUMENTS

| | | | | |
|---|---|---|---|---|
| 7,349,225 B1 * | 3/2008 | Bennett | ................. | H05K 1/144 174/250 |
| 2006/0239818 A1 * | 10/2006 | Gaffiero | ................ | B64C 27/007 416/61 |

(Continued)

*Primary Examiner* — Rebecca L Grusby
(74) *Attorney, Agent, or Firm* — Hanley, Flight & Zimmerman, LLC

(57) ABSTRACT

An aircraft body section comprises a first layer of composite material, a first group of conductive traces, a second layer of composite material, and a first group of conductive connectors. The first layer of composite material has an upper surface and a lower surface, with the lower surface forming an exterior surface of a body of the aircraft. The first group of conductive traces are formed on the upper surface of the first layer of composite material. The second layer of composite material is positioned on the first layer of composite material and has an upper surface and a lower surface, with the upper surface forming an interior surface of a body of the aircraft. The first group of conductive connectors is formed on the upper surface of the second layer of composite material and is configured to provide electrical connection from external conductors to the conductive traces.

17 Claims, 10 Drawing Sheets

(51) Int. Cl.

| | |
|---|---|
| ***B29K 307/04*** | (2006.01) |
| ***B29K 309/08*** | (2006.01) |
| ***B29L 31/30*** | (2006.01) |
| ***B32B 5/02*** | (2006.01) |
| ***B32B 17/02*** | (2006.01) |
| ***B32B 27/12*** | (2006.01) |
| ***B32B 37/10*** | (2006.01) |
| ***B64C 1/00*** | (2006.01) |
| ***B64F 5/10*** | (2017.01) |

(52) U.S. Cl.
CPC . *B29L 2031/3082* (2013.01); *B32B 2260/023* (2013.01); *B32B 2260/046* (2013.01); *B32B 2262/101* (2013.01); *B32B 2262/106* (2013.01); *B32B 2307/202* (2013.01); *B32B 2605/18* (2013.01); *B64C 2001/0072* (2013.01)

(58) Field of Classification Search
CPC .... B64C 2001/0072; B64F 5/10; Y02T 50/40; H05K 2201/09272; H05K 2201/09727
See application file for complete search history.

(56) References Cited

U.S. PATENT DOCUMENTS

2011/0011627 A1* 1/2011 Aspas Puertolas .... H05K 3/103 174/251
2011/0024165 A1* 2/2011 Olden .................... H05K 3/465 29/829
2011/0025429 A1* 2/2011 Syal ........................ H01P 3/081 333/34
2012/0197482 A1* 8/2012 Moser ................. G01M 5/0083 73/773
2015/0342077 A1* 11/2015 Dalal ........................ B64F 5/00 264/447
2016/0165728 A1* 6/2016 Fullam ................. H05K 1/0253 174/268
2016/0174369 A1* 6/2016 Safai ....................... B64C 1/061 362/382
2016/0343467 A1* 11/2016 Wen ..................... H01B 7/0823
2017/0043552 A1* 2/2017 Lenzi .................... B29C 70/025
2019/0031095 A1* 1/2019 Duce ........................ B60Q 3/51
2021/0037645 A1* 2/2021 Levesque .................. B64C 7/00
2022/0055324 A1* 2/2022 Hebert .................... B32B 7/025

* cited by examiner

AIRCRAFT BODY SECTION WITH MULTILAYER ELECTRICALLY CONDUCTIVE STRUCTURE AND METHODS OF FABRICATION

FIELD OF THE INVENTION

Embodiments of the current invention relate to layers of electrically conductive structures formed in aircraft body sections and methods of fabricating the sections.

BACKGROUND

Aircraft often include electronic control equipment in one location and the components and devices that they control in another location. In addition, sensors and other feedback devices are located away from the equipment to which they send electronic signals. For example, the cockpit of the aircraft holds the majority of the electronic equipment, such as navigation control, which transmits control signals to components such as the engines or the rudder. Furthermore, sensors, such as for measuring fuel or engine speed, may be located in the wings and transmit data signals back to the cockpit.

Typically, the control and data signals are transmitted through a plurality of electrically conductive cables or cable bundles, wherein each cable or cable bundle includes one or more electrical conductors, such as metal wires, that are surrounded by an insulating sleeve. Some cables may further include electromagnetic shielding that also surrounds the conductors. The cables occupy valuable space in an aircraft and add undesirable weight to the aircraft. The cables are ideally placed along the body of the aircraft, away from passenger and cargo areas, but there is often not available space along the body of the aircraft because other objects, such as structural framework or mechanical components, block the path which the cables should take.

In addition, electrical wire interconnection systems account for a large portion of aircraft equipment failures. Most of these failures are due to chafed insulation causing shorting, broken wires, incorrectly mated or cross mated wires, and loose connections.

SUMMARY OF THE INVENTION

Embodiments of the current invention solve the above-mentioned problems and provide an aircraft body section that includes electrically conductive layers embedded between layers of composite material that form the aircraft body. Conductive traces that can carry the control signals and data signals are formed on the electrically conductive layers which allows for the number of cables routed inside the aircraft to be significantly reduced. Furthermore, since the signals are actually routed within the aircraft body, they avoid the structural framework and mechanical components that would otherwise block their path.

An aircraft body section constructed in accordance with one embodiment of the invention broadly comprises a first layer of composite material, a first group of conductive traces, a second layer of composite material, and a first group of conductive connectors. The first layer of composite material has an upper surface and a lower surface, with the lower surface forming an exterior surface of a body of the aircraft. The first group of conductive traces are formed on the upper surface of the first layer of composite material. The second layer of composite material is positioned on the first layer of composite material and has an upper surface and a lower surface, with the upper surface forming an interior surface of a body of the aircraft. The first group of conductive connectors is formed on the upper surface of the second layer of composite material and is configured to provide electrical connection from external conductors to the conductive traces.

An aircraft body section constructed in accordance with another embodiment of the invention broadly comprises plurality of composite material layers, a flexible circuit substrate, and a trimmed composite material layer. The composite material layers are positioned one on another to form a stack. The flexible circuit substrate is positioned on an upper composite material layer and includes a plurality of conductive traces extending from one end of the flexible circuit substrate to an opposing end of the flexible circuit substrate. Each conductive trace includes a first conductive connector at a first end and a second conductive connector at a second, opposing end. The trimmed composite material layer is positioned on the flexible circuit substrate and includes a plurality of openings, each opening exposing a successive conductive connector.

Embodiments of the current invention also provide a method of designing a layout for an aircraft body section including a plurality of conductive traces. The method broadly comprises receiving information regarding a type of material to be used for a composite material layer of the aircraft body section; routing a conductive trace on the composite material layer in at least one direction without adjusting a width of the conductive trace when the conductive trace changes direction if the material is of a first type; and routing the conductive trace on the composite material layer in at least one direction and adjusting the width of the conductive trace to maintain a constant impedance of the conductive trace when the conductive trace changes direction if the material is of a second type.

Other embodiments of the current invention provide a method for fabricating an aircraft body section including a plurality of conductive traces. The method broadly comprises forming a first stack of composite material layers that do not have conductive layers positioned thereon; applying pressure to the first stack; for each composite material layer that has a conductive layer positioned thereon, forming conductive traces, conductive pads, or conductive connectors on the composite material layer; drilling a hole in one or more associated composite material layers for each conductive pad, or conductive connector that has an electrical connection from one conductive layer to an adjacent conductive layer; inserting vias in the holes of the one or more associated composite material layers; forming a second stack of composite material layers that have conductive layers positioned thereon; applying pressure to the second stack; forming a third stack that includes the first stack and the second stack and a layer of resin therebetween; and applying pressure to the third stack.

Still other embodiments of the current invention provide a method for fabricating an aircraft body section including a plurality of conductive traces. The method broadly comprises receiving a flexible circuit substrate that includes at least one insulating layer, a plurality of conductive traces, and a plurality of conductive connectors; trimming a layer of composite material to remove material to create a plurality of openings in alignment with the conductive connectors on the flexible circuit to form a trimmed composite material layer; forming a stack including a plurality of composite material layers and the flexible circuit substrate with the composite material layers below the flexible circuit substrate and the trimmed composite material layer above the flexible circuit substrate; and applying pressure to the stack.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
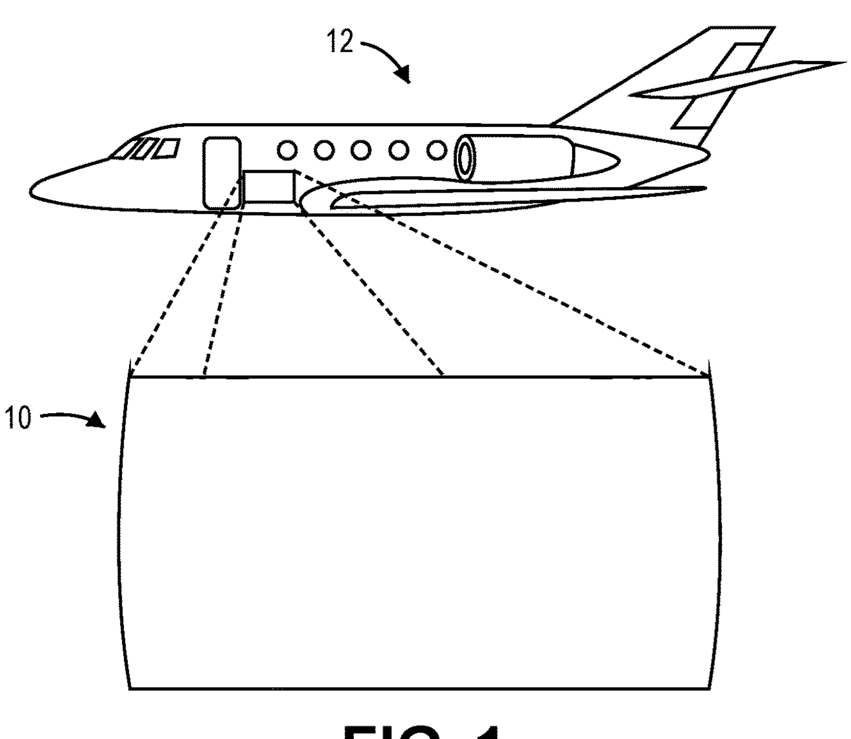
FIG. 1 is a side view of an aircraft including a body section constructed in accordance with various embodiments of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 2:
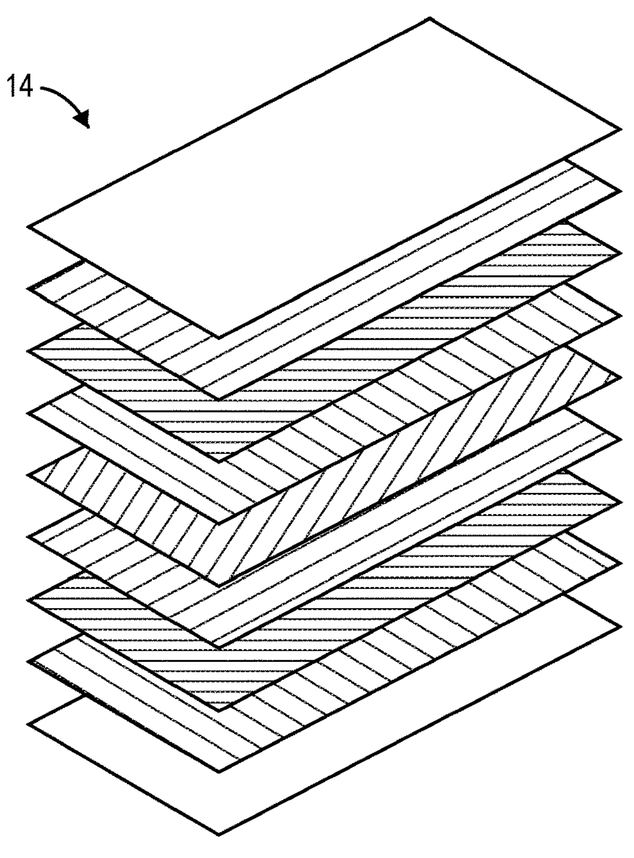
FIG. 2 is a perspective view of a stack of composite material layers that, in part, form the aircraft body section.
Figure 3:
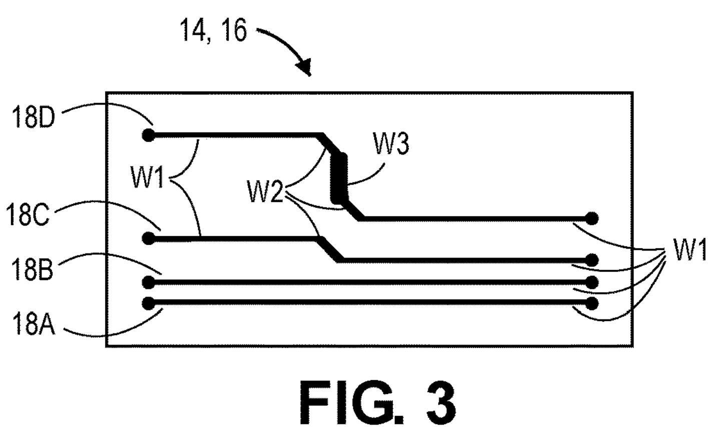
FIG. 3 is a top view of a composite material layer with conductive traces of a conductive layer positioned on the composite material layer.
Figure 4:
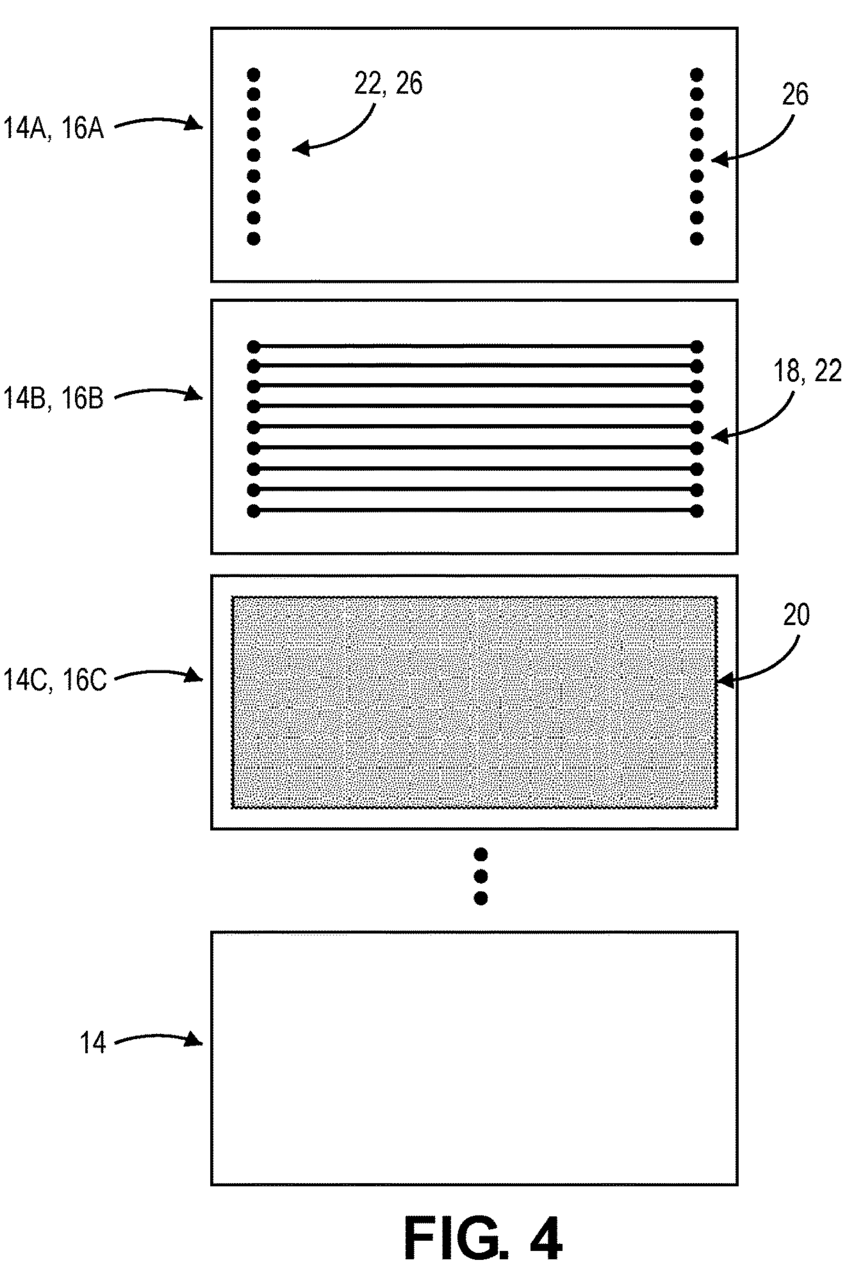
FIG. 4 is a top view of a stack of composite material layers, each with a conductive layer positioned thereon.

A body section 10, constructed in accordance with various embodiments of the current invention, of an aircraft 12 is shown in FIG. 1. The body section 10 may be a portion of a fuselage, a wing, a tail section, or the like. The aircraft 12 may be an airplane, such as a jet airplane, a helicopter, a flying car, or other aerial vehicle. The body section 10, as shown in FIGS. 2-4, broadly comprises a plurality of composite material layers 14 and a plurality of electrically conductive layers 16. Embodiments of the body section 10 may further include or interface with a plurality of conductive connectors 32.

Referring to FIG. 2, an exemplary stack of composite material layers 14 is shown. Each composite material layer 14 includes a fiber component and a matrix component. The fiber component may include fibers formed from glass such as S-glass, E-glass, etc., aramids such as Kevlar, etc., carbon, or the like. The matrix component may include polymer resins, such as an Epoxy or Bismaleimide (BMI), and so forth. In some instances, the fibers of the composite material layer 14 are arranged such that the fibers are all oriented in a single direction (unidirectional). In other instances, the fibers are oriented in two or more directions and are woven together to form a fabric, that has a plain weave, a twill weave, a satin weave, or the like. Additionally, a chopped carbon composite may be used. The stack of composite material layers 14 may include unidirectional layers, fabric layers, or combinations thereof. In some embodiments, one or more layers of carbon fiber may be positioned between layers of other material to increase the stiffness of the body section 10. The stack may include a number of composite material layers 14 that ranges from approximately 6 to approximately 30, with the number varying according to a location on the aircraft 12 of the body section 10 and the strength requirements of the body section 10. Each composite material layer 14 may have a thickness ranging from approximately 5.3 mils to approximately 7.5 mils.

The top composite material layer 14 of the stack shown in FIG. 2 forms an inner surface, or innermost layer (IML), of the body (i.e., fuselage, wing, tail section) of the aircraft 12. The bottom composite material layer 14 of the stack of FIG. 2 forms an outer surface, or outermost layer (OML), of the body of the aircraft 12.

The conductive layers 16, as shown in FIGS. 3 and 4, may be formed from metals and/or metal alloys typically including copper, but also including nickel, aluminum, gold, silver, palladium, zinc, tin, lead, and the like. Each conductive layer 16 may be positioned on a successive composite material layer 14. The conductive layer 16 may be printed on the composite material layer 14, deposited, patterned, and etched on the composite material layer 14, 3D printed, or positioned using other techniques.

Each conductive layer 16 may include one or more conductive traces 18, one or more conductive planes 20, and one or more conductive pads 22. The conductive traces 18 include electronic signal traces, which carry electronic signals, and electric power or ground traces, which provide electric voltage or electric ground. Each conductive trace 18 is typically of linear shape with a length that is much greater than a width. The conductive traces 18 may be curved, straight, or multi-segmented. Each conductive trace 18 or each segment of a conductive trace 18 may be oriented at a nonzero angle with respect to other conductive traces 18 or other segments of the conductive trace 18. For example, a multi-segmented conductive trace 18 may include a first segment oriented at 0 degrees, a second segment oriented at 45 degrees or 135 degrees, a third segment oriented at 90 degrees, and so forth. Or, one or more conductive traces 18 may be oriented at 45 degrees, 90 degrees, or 135 degrees with respect to other conductive traces 18. The width of each conductive trace 18, or segment thereof, may vary according to an amount of electric current that the conductive trace 18 is required to carry. For conductive layers 16 positioned on unidirectional composite material layers 14 of carbon fiber, the width of each conductive trace 18, or segment thereof, may also vary according to a relative angle of orientation between the direction of the segment of the conductive trace 18 and the direction of the unidirectional fibers of the composite material layer 14. The width of the conductive trace 18 is adjusted as the conductive trace 18 changes direction to ensure a certain impedance of the conductive trace 18 based on a height of the conductive trace 18 above the composite material layer 14 and a dielectric constant in the direction of conductive trace 18. The following equations, EQ. 1 and EQ. 2, provide calculations to determine the impedance and the dielectric constant if the conductive trace 18 is treated as a microstrip.

$$Z_0 = \frac{60}{\sqrt{\varepsilon_{eff}}} \times \ln\left(\frac{8h}{w} + \frac{w}{4h}\right) \quad \text{EQ. 1}$$

$$\varepsilon_{eff} = \frac{\varepsilon_r + 1}{2} + \frac{\varepsilon_r - 1}{2}\left[\frac{1}{\sqrt{1 + \frac{12h}{w}}} + 0.04\left(1 - \frac{w}{h}\right)^2\right] \quad \text{EQ. 2}$$

Where "h" is the height of the conductive trace 18 above a ground plane, "w" is the width of the conductive trace 18, Er is the dielectric constant of the composite material layer 14, and $\varepsilon_{eff}$ is the dielectric constant based on the width and the height of the conductive trace 18.

An example of adjusting the width of a conductive trace 18 based on the orientation, or direction, of the conductive trace 18 positioned on a composite material layer 14 formed from carbon fiber is shown in FIG. 3. Four conductive traces 18 are positioned on a composite material layer 14, including first and second conductive traces 18A, 18B that are straight and have a single segment, a third conductive trace 18C having first and second segments oriented at approximately 0 degrees and a third segment oriented at approximately 135 degrees, and a fourth conductive trace 18D having first and second segments oriented at approximately 0 degrees, third and fourth segments oriented at approximately 135 degrees, and a fifth segment oriented at approximately 90 degrees. All conductive traces 18 and segments thereof oriented at approximately 0 degrees have a first width. All segments of conductive traces 18 oriented at approximately 135 degrees have a second width. And segments of conductive traces 18 oriented at approximately 90 degrees have a third width. The widths of the conductive traces 18 may be determined or calculated using EQ. 1 and EQ. 2.

Each conductive plane 20 may include a solid sheet of electrically conductive material and may cover an area that roughly overlaps an area covered by conductive traces 18 on an adjacent conductive layer 16. The conductive plane 20 receives its voltage level through one or more other conductive layers 16.

Each conductive pad 22 is configured to receive an electrical connection from a conductive wire or cable or from a via 26, discussed below. Additionally, or alternatively, when the conductive pads 22 are implemented on an outer composite material layer 14, the conductive pads 22 may have electrical components, such as surface mount passive or active electrical or electronic devices, electrically connected thereto, such as by solder flow.

On the composite material layers 14 between two adjacent conductive layers 16, there may be one or more electrically conductive vias 26, each being of cylindrical shape formed from a metal or metal alloy and positioned in a hole in the composite material layer 14, to electrically connect conductive traces 18, conductive planes 20, and conductive pads 22 from one conductive layer 16 to another conductive layer 16. Each via 26 may be formed by electroplating a successive opening in the composite material layer 14.

A body section 10 with an exemplary stack, or a partial stack, of composite material layers 14 and conductive layers 16 is shown in FIG. 4. The body section 10 includes a first composite material layer 14A with a first conductive layer 16A positioned thereon. Generally, the first conductive layer 16 is positioned on a first outer surface of the body section 10 and includes conductive pads 22 to be electrically connected to certain types of cables 30A. The first layers 14A, 16A face the interior of the aircraft 12, such as the interior of the fuselage, the wing, or the tail section. In the exemplary stack of layers shown in FIG. 4, the first conductive layer 16A includes a plurality of conductive pads 22. The body section 10 also includes a second composite material layer 14B and a second conductive layer 16B, which includes a plurality of conductive traces 18 and pads 22, which provide simple electrical connection from a first end of the body section 10 to an opposing second end of the body section 10. Each conductive trace 18 may optionally include a pair of conductive pads 22, one conductive pad 22 at each end of the conductive trace 18. Each pad 22 may align with and electrically connect to a successive via 26. The body section 10 also includes a third composite material layer 14C and a third conductive layer 16C, which includes a conductive plane 20 that may be electrically connected to electric power or ground. In some embodiments, the third composite material layer 14C and the third conductive layer 16C may be the last layers with the third composite material layer 14C facing the exterior of the aircraft 12. Thus, the third conductive layer 16C faces the second composite material layer 14, and the opposite surface of the third composite material layer 14 is fabric and forms a second outer surface of the body section 10. In other embodiments, the body section 10 may further include one or more additional composite material layers 14, without additional conductive layers 16, to provide additional strength to the body section 10.

An exemplary body section 10, such as the one shown in FIG. 4, may be formed using design rules that allow for a conductive trace 18 to be 16 mils wide and have a spacing between adjacent conductive traces 18 of 24 mils, yielding a pitch for conductive traces 18 of 40 mils. If the body section 10 is 36 inches wide, then a single conductive layer 16 may include 900 conductive traces 18. If the body section 10 includes 8 conductive layers 16, then the body section 10 may include approximately 7,200 conductive traces 18, assuming maximum usage of the space on each layer. Thus, embodiments of the current invention provide an increase in the number of conductors that occupy a space as compared with implementation that utilize cables.

Figure 5A:
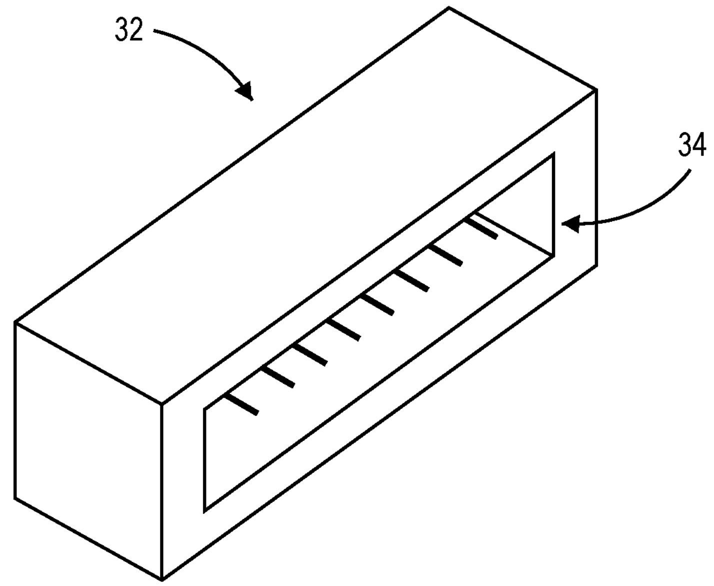
FIG. 5A is a perspective view of a conductive connector included with, or utilized with, the aircraft body section.
Figure 5B:
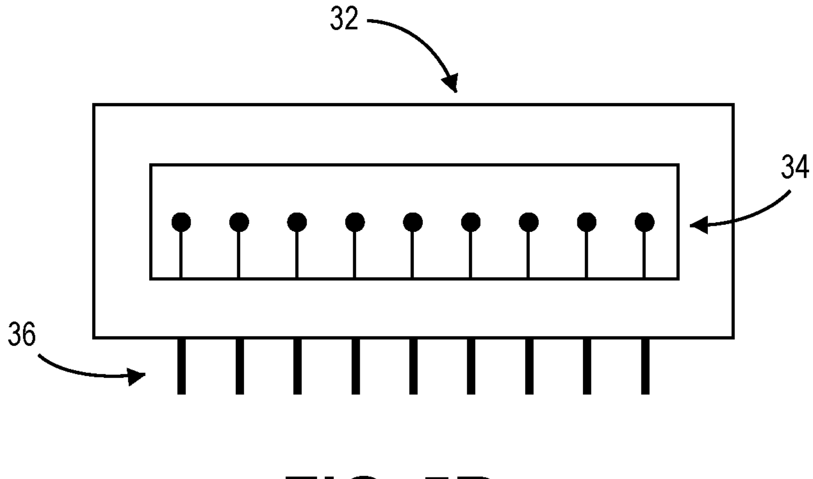
FIG. 5B is a front view of the conductive connector.

Referring to FIGS. 5A and 5B, each conductive connector 32 includes a housing with six walls connected to one another to form a rectangular box. A front wall includes a face with an opening forming a receptacle 34 configured to receive a connector of an external multi wire cable. The receptacle 34 may receive male type connectors or female type connectors. Within the receptacle 34, the conductive connector 32 includes a plurality of conductive contacts that mate with the conductors of the cable connector. The conductive connector 32 further includes a plurality of conductive pins 36 protruding from a bottom wall. The pins 36 are electrically connected to the conductors within the receptacle so that the pins 36 are electrically connected to the conductors of the external cable when the cable is plugged into the conductive connector 32. The conductive connector 32 may be mounted on, or attached to, the body section 10 such that the pins 36 are plugged into the openings in composite material layers 14 for the vias 26 and the pins 36 electrically connect to the vias 26. The pins 36 may be connected to the vias 26 with solder.

In other embodiments, the conductive connector 32 may have a receptacle 34 configured to receive a cylindrical or round cable connector. In general, the conductive connector 32 may be configured to interface with standardized connectors for networking, such as ethernet, video, such as HDMI, electronic device communication, such as USB, and so forth. Additionally, or alternatively, the conductive connector 32 and components, such as a line replaceable unit (LRU), to which the conductive connector 32 couples, may have male and female pin configurations of the same style so that the LRU may plug directly into the conductive connector 32 without the need for a cable.

Figure 6A:
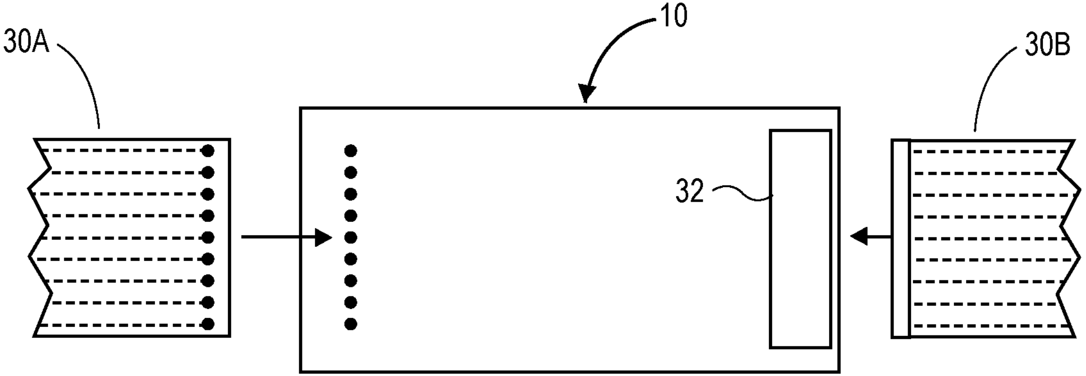
FIG. 6A is a top view of the aircraft body section with first and second cables aligned with conductive pads and a conductive connector, respectively.
Figure 6B:
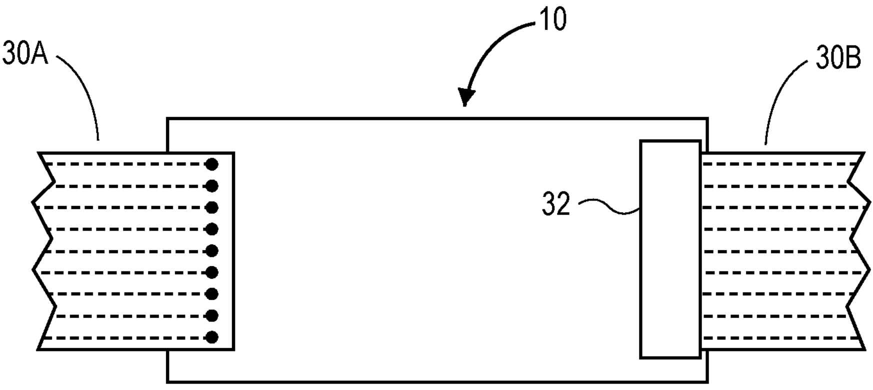
FIG. 6B is a top view of the aircraft body section with first and second cables electrically connected thereto.
Figure 6C:
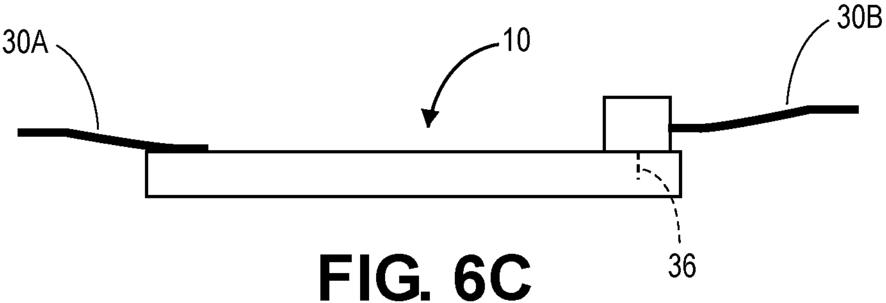
FIG. 6C is a side view of the aircraft body section with first and second cables electrically connected thereto.

Referring to FIGS. 6A, 6B, and 6C, views, of an exemplary implementation of the body section 10 with first and second cables 30A, 30B are shown. The body section 10 may be the body section 10 shown in FIG. 4. The first and second cables 30A, 30B are shown in multi-conductor ribbon cables, but multi-conductor round cables or cable bundles may be used, as well as other types of cables. The first cable 30A electrically connects to conductive pads 22 at a first end of the body section 10 through soldering or other direct connect techniques, while the second cable 30B includes a connector that is plugged into the receptacle of a conductive connector 32 mounted on the body section 10 at a second end. The first and second cables 30A, 30B may electrically connect the body section 10 to other body sections 10, electrical power sources, or equipment or devices requiring electrical power.

Figure 7:
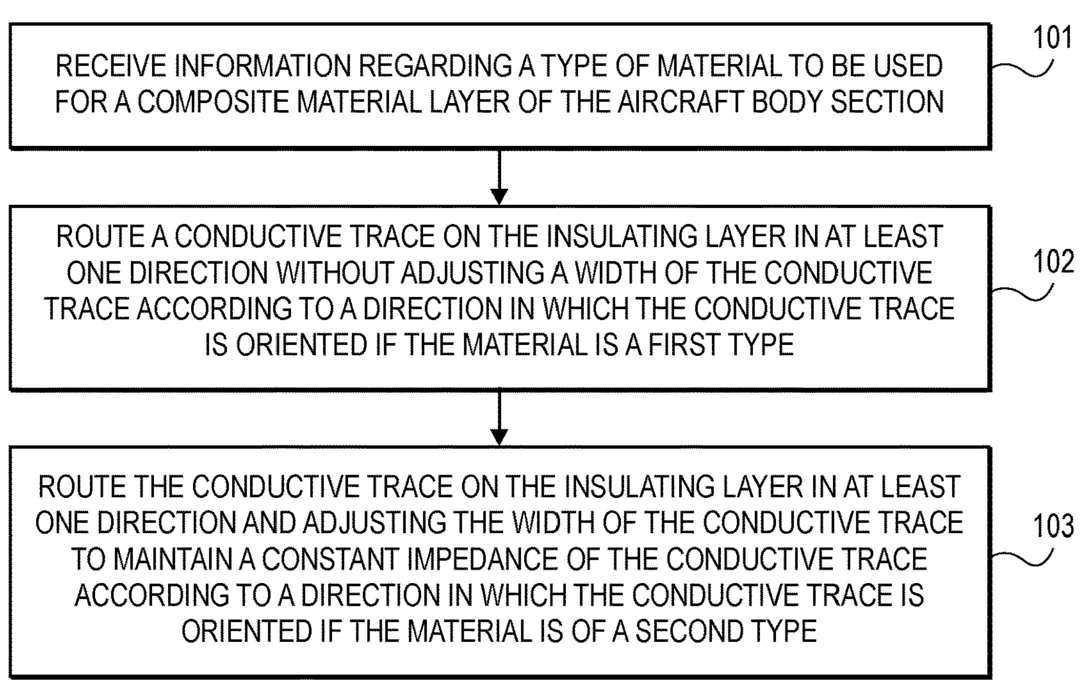
FIG. 7 is a listing of at least a portion of steps of a method for designing a layout for an aircraft body section including a plurality of conductive traces.
Figure 8:
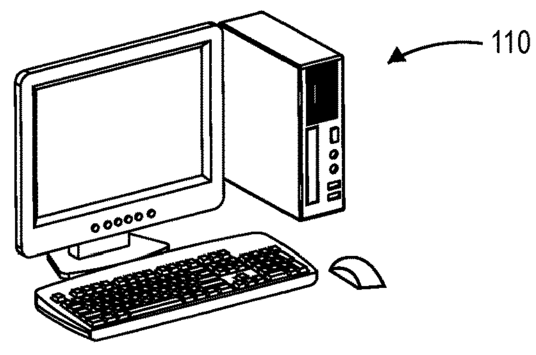
FIG. 8 is a perspective view of a computing device configured to perform the steps of the method for designing a layout for an aircraft body section including a plurality of conductive traces.
Figure 9:
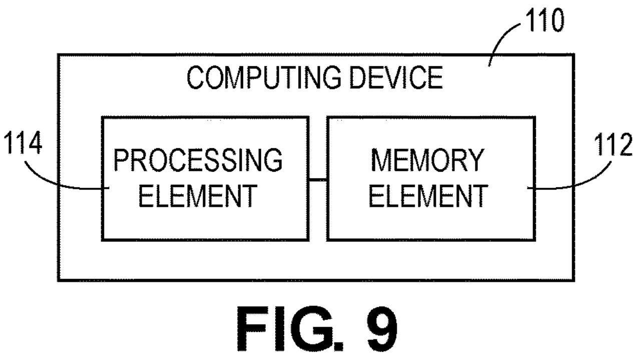
FIG. 9 is a schematic block diagram of electronic components of the computing device.

FIG. 7 depicts a listing of at least a portion of the steps of a method 100 for designing a layout for an aircraft body section 10 including a plurality of conductive traces 18. The steps may be performed in the order shown in FIG. 7, or they may be performed in a different order. Furthermore, some steps may be performed concurrently as opposed to sequentially. In addition, some steps may be optional or may not be performed. The method 100 may be performed by a computing device 110 comprising a memory element 112 and a processing element 114, as shown in FIGS. 8 and 9.

The memory element 112 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 112 may be embedded in, or packaged in the same package as, the processing element 114. The memory element 112 may include, or may constitute, a non-transitory "computer-readable medium". The memory element 112 may store the instructions, code, code statements, code segments, software, firmware, programs, applications, apps, services, daemons, or the like that are executed by the processing element 114. The memory element 112 may also store data that is received by the processing element 114 or the device in which the processing element 114 is implemented. The processing element 114 may further store data or intermediate results generated during processing, calculations, and/or computations as well as data or final results after processing, calculations, and/or computations. In addition, the memory element 112 may store settings, data, documents, sound files, photographs, movies, images, databases, and the like.

The processing element 114 may comprise one or more processors. The processing element 114 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 114 may generally execute, process, or run instructions, code, code segments, code statements, software, firmware, programs, applications, apps, processes, services, daemons, or the like. The processing element 114 may also include hardware components such as registers, finite-state machines, sequential and combinational logic, configurable logic blocks, and other electronic circuits that can perform the functions necessary for the operation of the current invention. In certain embodiments, the processing element 114 may include multiple computational components and functional blocks that are packaged separately but function as a single unit. The processing element 114 may be in electronic communication with the other electronic components through serial or parallel links that include universal busses, address busses, data busses, control lines, and the like. The processing element 114 may be operable, configured, or programmed to perform the following steps or functions by utilizing hardware, software, firmware, or combinations thereof. In various embodiments, the following steps may be performed by the computing device 110 executing or running electronic computer aided design (ECAD) software to design a layout of an electronic circuit onto a substrate.

Referring to step 101, information is received regarding a type of material to be used for a composite material layer 14 of the aircraft body section 10. The aircraft body section 10 includes a plurality of composite material layers 14 and a plurality of conductive layers 16. Each composite material layer 14 is formed from a composite material, which generally includes a fiber component and a matrix component. The fiber component may include fibers formed from glass such as S-glass, E-glass, etc., aramids such as Kevlar, etc., carbon, or the like. The matrix component may include polymer resins, such as an Epoxy or Bismaleimide (BMI), and so forth. In some instances, the fibers of the composite material layer 14 are arranged such that the fibers are all oriented in a single direction (unidirectional). In other instances, the fibers are oriented in two or more directions and are woven together to form a fabric, that has a plain weave, a twill weave, a satin weave, or the like. Additionally, a chopped carbon composite may be used. The stack of composite material layers 14 may include unidirectional layers, fabric layers, or combinations thereof.

The conductive layers 16 may be formed from metals and/or metal alloys typically including copper, but also including nickel, aluminum, gold, silver, palladium, zinc, tin, lead, and the like. Each conductive layer 16 may be positioned on a successive composite material layer 14. Each conductive layer 16 may include one or more conductive traces 18, one or more conductive planes 20, and one or more conductive pads 22. The conductive traces 18 include electronic signal traces, which carry electronic signals, and electric power or ground traces, which provide electric voltage or electric ground. Each conductive plane 20 may include a solid sheet of electrically conductive material and may cover an area that roughly overlaps an area covered by conductive traces 18 on an adjacent conductive layer 16. Each conductive pad 22 is configured to receive an electrical connection from a conductive wire or cable or from a via 26.

Referring to step 102, at least one conductive trace 18 is routed on the composite material layer 14 in at least one direction without adjusting a width of the conductive trace 18 according to a direction in which the conductive trace 18 is oriented if the material is of a first type. The conductive traces 18 may be curved, straight, or multi-segmented. Each conductive trace 18 or each segment of a conductive trace 18 may be oriented at a nonzero angle with respect to other conductive traces 18 or other segments of the conductive trace 18. For example, a multi-segmented conductive trace 18 may include a first segment oriented at 0 degrees, a second segment oriented at 45 degrees or 135 degrees, a third segment oriented at 90 degrees, and so forth. Or, one or more conductive traces 18 may be oriented at 45 degrees, 90 degrees, or 135 degrees with respect to other conductive traces 18. For composite material layers 14 formed from glass fibers, aramid fibers, or multi-directional carbon fibers, the conductive traces 18, or segments thereof, may be oriented in any direction without adjusting the width of the conductive trace 18 based on the direction.

Referring to step 103, at least one conductive trace 18 is routed on the composite material layer 14 in at least one direction and the width of the conductive trace 18 is adjusted to maintain a constant impedance of the conductive trace 18 according to a direction in which the conductive trace 18 is oriented if the material is of a second type. For conductive layers 16 positioned on unidirectional composite material layers 14 of carbon fiber, the width of each conductive trace 18, or segment thereof, may also vary according to a relative angle of orientation between the direction of the segment of the conductive trace 18 and the direction of the unidirectional fibers of the composite material layer 14. An example of adjusting the width of a conductive trace 18 based on the orientation, or direction, of the conductive trace 18 positioned on a composite material layer 14 formed from carbon fiber is shown in FIG. 3. Four conductive traces 18 are positioned on a composite material layer 14, including first and second conductive traces 18A, 18B that are straight and have a single segment, a third conductive trace 18C having first and second segments oriented at approximately 0 degrees and a third segment oriented at approximately 135 degrees, and a fourth conductive trace 18D having first and second segments oriented at approximately 0 degrees, third and fourth segments oriented at approximately 135 degrees, and a fifth segment oriented at approximately 90 degrees. All conductive traces 18 and segments thereof oriented at approximately 0 degrees have a first width. All segments of conductive traces 18 oriented at approximately 135 degrees have a second width. And segments of conductive traces 18 oriented at approximately 90 degrees have a third width. The widths of the conductive traces 18 may be determined or calculated using EQ. 1 and EQ. 2.

Figure 10:
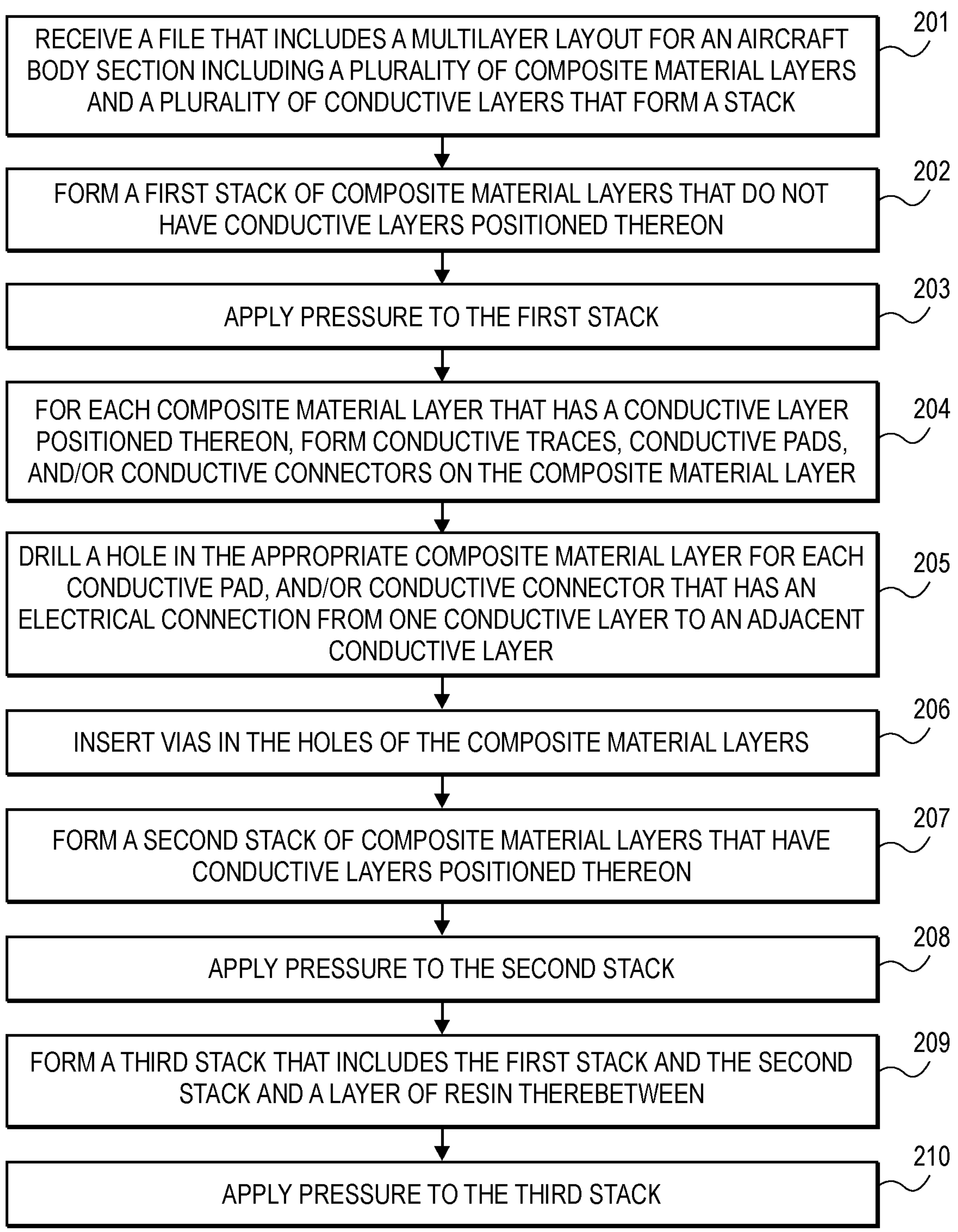
FIG. 10 is a listing of at least a portion of steps of a method for fabricating an aircraft body section including a plurality of conductive traces.

FIG. 10 depicts a listing of at least a portion of the steps of a method 200 for fabricating an aircraft body section 10 including a plurality of conductive traces 18. The steps may be performed in the order shown in FIG. 10, or they may be performed in a different order. Furthermore, some steps may be performed concurrently as opposed to sequentially. In addition, some steps may be optional or may not be performed.

Referring to step 201, a file is received that includes a multilayer layout for an aircraft body section including a plurality of composite material layers 14 and a plurality of conductive layers 16 that form a stack. Each composite material layer 14 is formed from a composite material, which generally includes a fiber component and a matrix component. The fiber component may include fibers formed from glass such as S-glass, E-glass, etc., aramids such as Kevlar, etc., carbon, or the like. The matrix component may include polymer resins, such as an Epoxy or Bismaleimide (BMI), and so forth. In some instances, the fibers of the composite material layer 14 are arranged such that the fibers are all oriented in a single direction (unidirectional). In other instances, the fibers are oriented in two or more directions and are woven together to form a fabric, that has a plain weave, a twill weave, a satin weave, or the like. The stack of composite material layers 14 may include unidirectional layers, fabric layers, or combinations thereof.

The conductive layers 16 may be formed from metals and/or metal alloys typically including copper, but also including nickel, aluminum, gold, silver, palladium, zinc, tin, lead, and the like. Each conductive layer 16 may be positioned on a successive composite material layer 14. Each conductive layer 16 may include one or more conductive traces 18, one or more conductive planes 20, and one or more conductive pads 22. The conductive traces 18 include electronic signal traces, which carry electronic signals, and electric power or ground traces, which provide electric voltage or electric ground. Each conductive plane 20 may include a solid sheet of electrically conductive material and may cover an area that roughly overlaps an area covered by conductive traces 18 on an adjacent conductive layer 16. Each conductive pad 22 is configured to receive an electrical connection from a conductive wire or cable or from a via 26. Each conductive layer 16 is positioned on a successive one of the composite material layers 14. In some embodiments, there may be a greater number of composite material layers 14 than conductive layers 16. Accordingly, there may be some composite material layers 14 without conductive layers 16 positioned thereon.

The multilayer layout specifies a number of layers of each type of layer, the order of the layers, the type of material for each composite material layer 14, the types of components on each conductive layer 16, the electrical connections between components on adjacent conductive layers 16, and the like.

The file that specifies the multilayer layout may be produced or generated by an electronic CAD layout software program and may include Gerber file formatted data.

Figure 12:
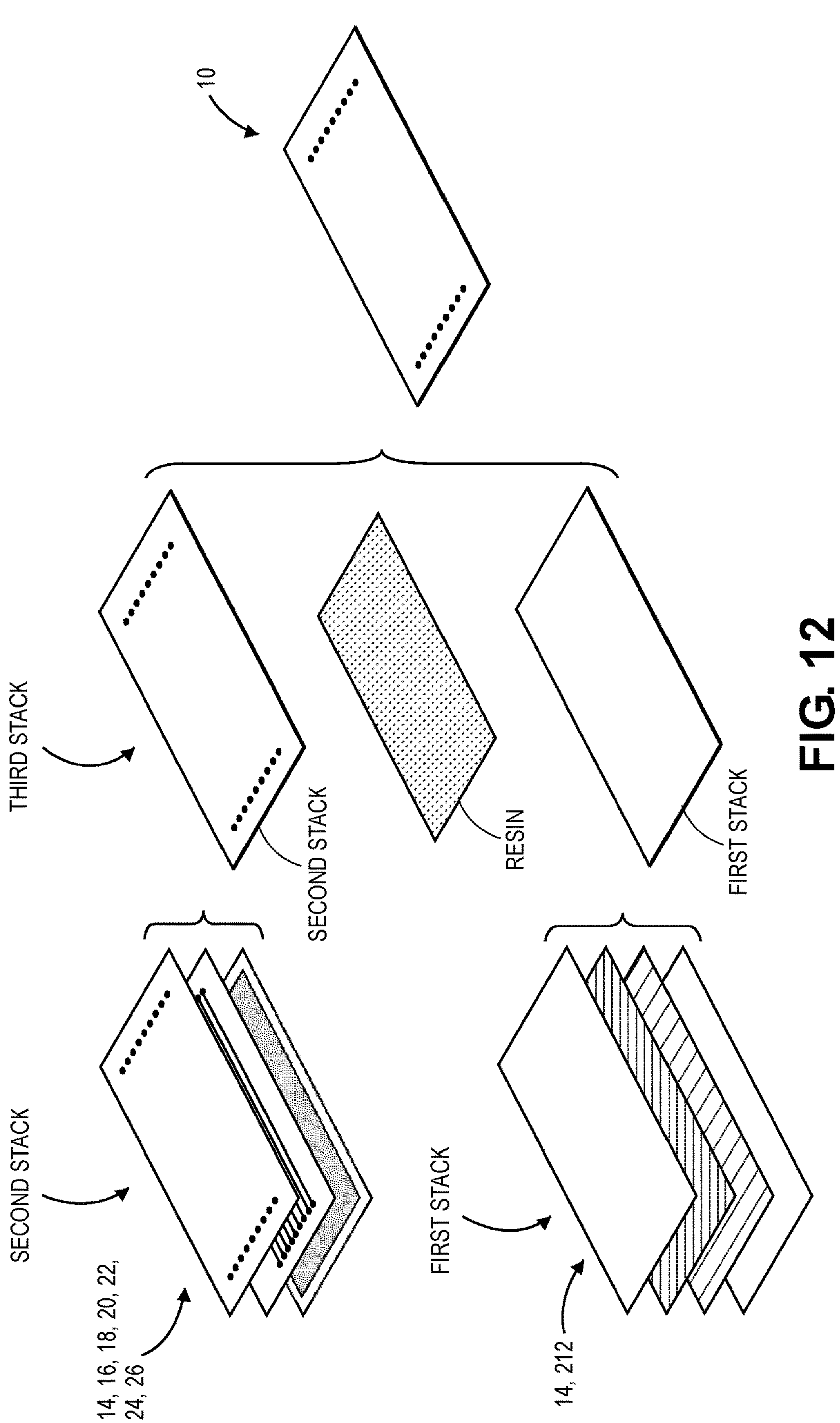
FIG. 12 is a perspective view of various stacks of composite material layers and conductive layers used during the method of FIG. 11 to form the aircraft body section.

Referring to step 202 and FIG. 12, a first stack 212 of composite material layers 14 that do not have conductive layers 16 positioned thereon is formed. A plurality of composite material layers 14, without intervening conductive layers 16, may be included in the body section 10 to provide strength to the body section 10. The first stack may be formed by placing the composite material layers 14 one on another.

Figure 11:
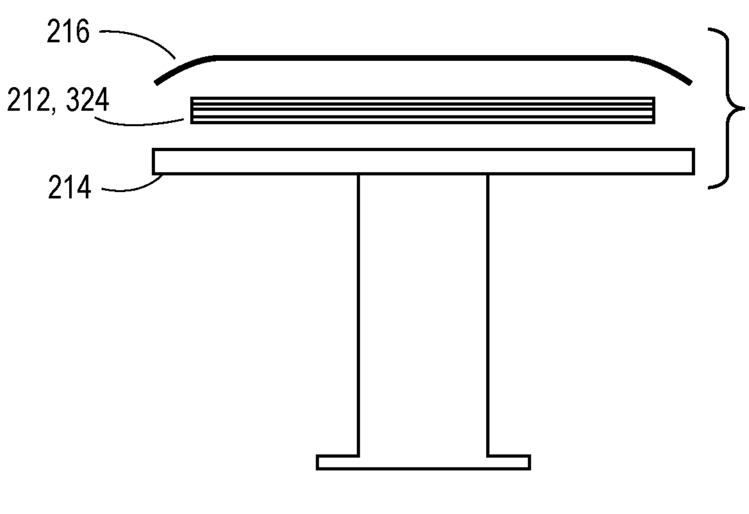
FIG. 11 is a side view of a tool and a vacuum bag configured to perform at least a portion of the steps of the method for fabricating an aircraft body section including a plurality of conductive traces.

Referring to step 203, pressure is applied to the first stack 212. The pressure may be applied using one of any known technique. As shown in FIG. 11, an exemplary technique may include placing the first stack 212 on a tool 214 or mold that has an upper surface with a shape for the first stack 212 to take, such as flat, contoured, concave, convex, etc. At least one bag 216 or film is placed on top of the first stack 212 of composite material layers 14. A vacuum is applied between the bag 216 and the tool 214, which compresses the stack of composite material layers 14 against the upper surface of the tool 214. Heat may also be applied to the first stack 212. The vacuum is released, the bag 216 is removed, and the first stack 212 is completed.

Referring to step 204, for each composite material layer 14 that has a conductive layer 16 positioned thereon, conductive traces 18 and/or conductive pads 22 are formed on the composite material layer 14. The conductive layer 16 may be printed on the composite material layer 14, deposited, patterned, and etched on the composite material layer 14, 3D printed, or positioned using other techniques. Another technique may involve coating, or otherwise placing, a layer or film of metal or metal alloy on at least one of the surfaces of a composite material layer 14. A layer of photoresist is deposited on top of the metal. A transparent film with a positive image, or negative image as appropriate, of the conductive components is placed on top of the photoresist. The film and the photoresist underneath are exposed to ultraviolet light. The film is removed and the uncured photoresist is stripped off. The metal with no photoresist covering it is then etched—leaving conductive traces 18 and/or conductive pads 22 present on the composite material layer 14.

Referring to step 205, a hole is drilled in the appropriate composite material layer 14 for each conductive pad 22 that has an electrical connection from one conductive layer 16 to an adjacent conductive layer 16. Conductive components on one conductive layer 16 that electrically connect to conductive components on an adjacent conductive layer 16 utilize a via 26—that is, one via 26 for each electrical connection to be made. Accordingly, one hole is drilled in the intervening composite material layer 14 for each via 26. Furthermore, holes are drilled in each composite material layer 14 for which electrical interconnects are needed.

Referring to step 206, vias 26 are inserted in the holes of the composite material layers 14. Each via 26 is a solid or hollow cylinder formed from a metal or metal alloy. The vias 26 may be placed in the holes by plating, pasting, printing, or the like.

Referring to step 207 and FIG. 12, a second stack of composite material layers 14 that have conductive layers 16 positioned thereon is formed. The composite material layers 14 with conductive layers 16 positioned thereon are placed one on another in the correct order. In some embodiments, alignment holes and/or registration marks are added to at least a portion of the composite material layers 14 to ensure that the features on each layer are properly aligned when the stack is formed.

Referring to step 208, pressure is applied to the second stack. The pressure may be applied in the same manner as described for step 202 in which the second stack is placed on a tool 214 and covered by a bag 216. A vacuum is applied between the bag 216 and the tool 214, which compresses and completes the second stack.

Referring to step 209 and FIG. 12, a third stack that includes the first stack and the second stack and a layer of resin therebetween is formed. The first stack may be placed on the upper surface of the tool. A layer of resin may be applied to the upper surface of the first stack. The second stack may be placed on top of the layer of resin such that the outer conductive layer 16 is exposed.

Referring to step 210, pressure is applied to the third stack. The pressure may be applied in the same manner as described for step 202 in which the third stack, already on the tool 214, is covered by a bag 216. A vacuum is applied between the bag 216 and the tool 214, which compresses and completes the third stack which in turn completes the body section 10.

Figure 13:
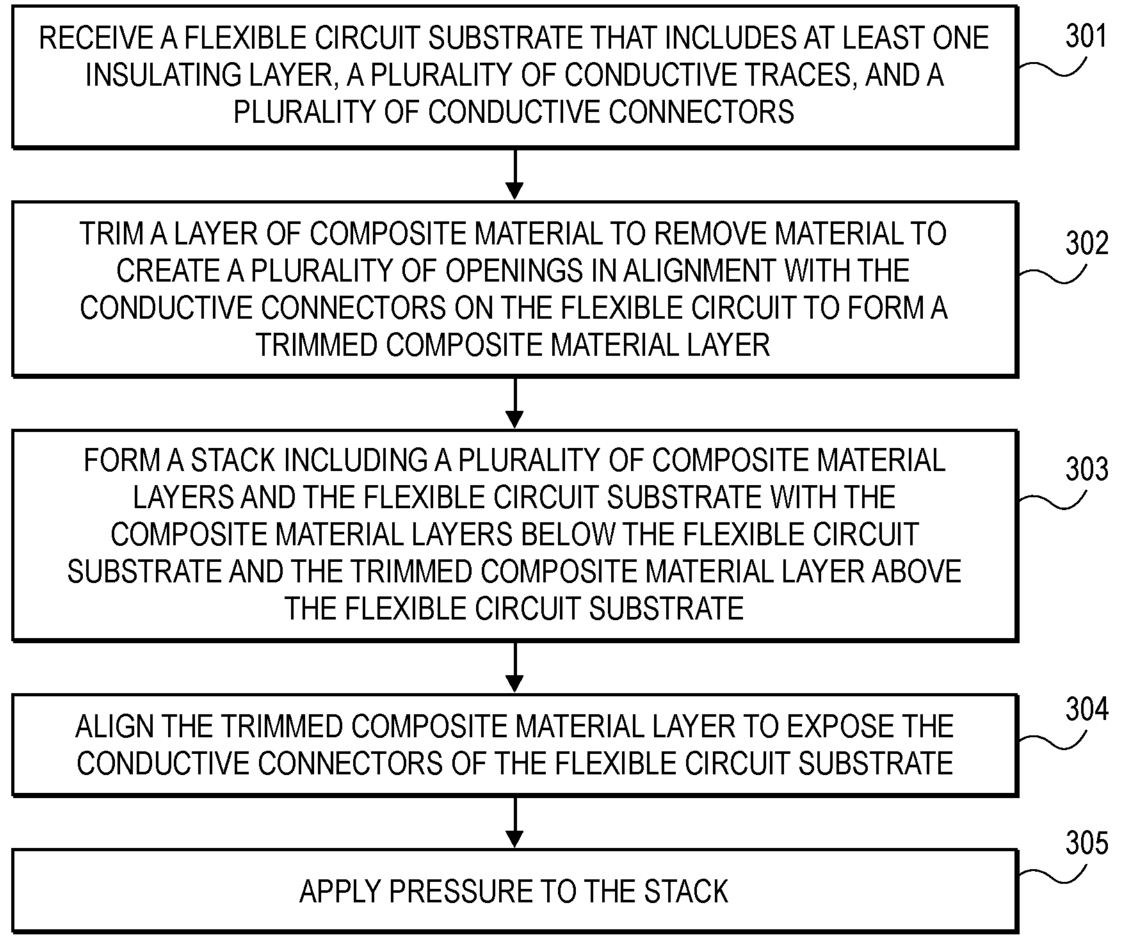
FIG. 13 is a listing of at least a portion of steps of another method for fabricating an aircraft body section including a plurality of conductive traces.

FIG. 13 depicts a listing of at least a portion of the steps of a method 300 for fabricating an aircraft body section 310 including a plurality of conductive traces 18. The steps may be performed in the order shown in FIG. 13, or they may be performed in a different order. Furthermore, some steps may be performed concurrently as opposed to sequentially. In addition, some steps may be optional or may not be performed. The method 300 allows for prefabricated electrically conductive substrates to be utilized in the formation of the aircraft body section 310. Typically, the electrically conductive substrates allow for electronic signal and/or electrical power feedthrough, wherein the electronic signals and/or electrical power enter the aircraft body section 310 at one end and exit the aircraft body section 310 at an opposing end.

Figure 14:
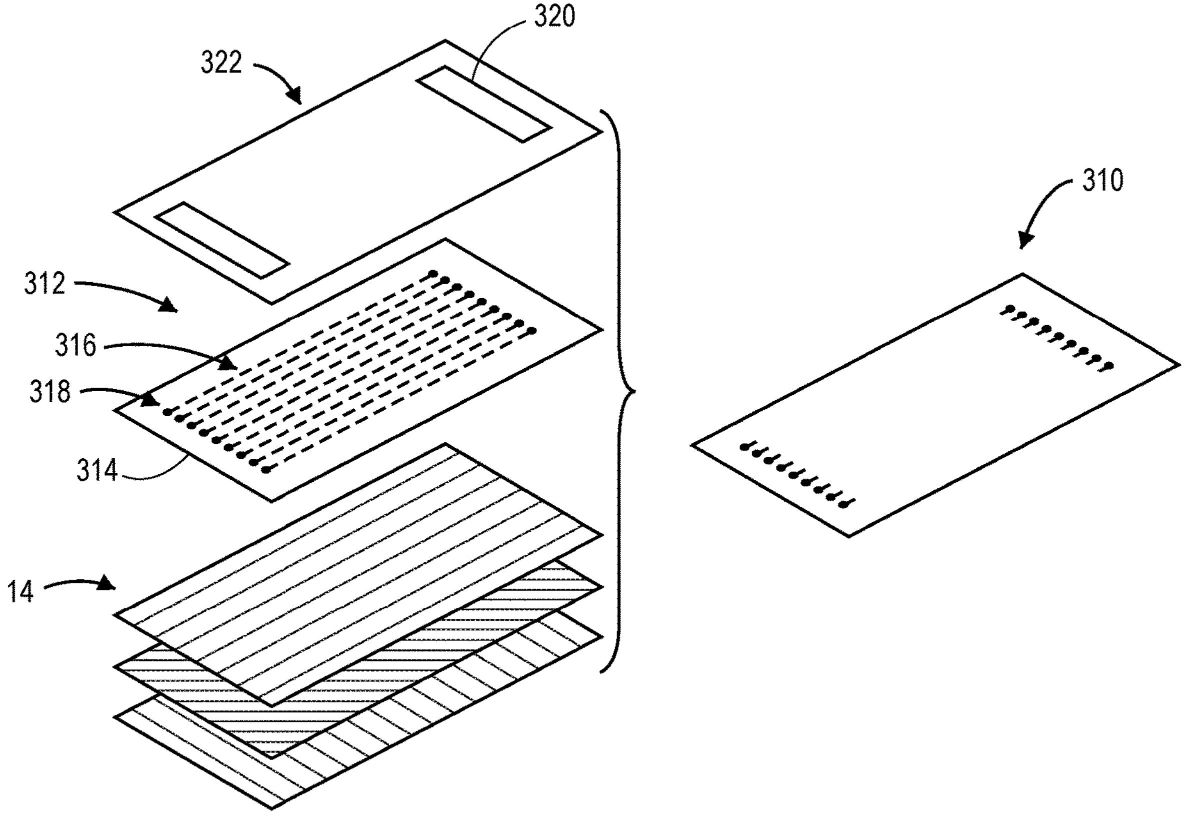
FIG. 14 is a perspective view of various stacks of composite material layers and conductive layers used during the method of FIG. 13 to form the aircraft body section.

Referring to step 301, a flexible circuit substrate 312 is received that includes at least one insulating layer 314, a plurality of conductive traces 316, and a plurality of conductive connectors 318, as shown in FIG. 14. The conductive connector 318 may include conductive pads and/or via structures. The flexible circuit substrate 312 may further include conductive planes (not shown in the figures). The insulating layer 314 may be formed from flexible polymers such as polyimide or other insulators or dielectrics. The conductive traces 316 are formed from electrically conductive material and are substantially similar to the conductive traces 18. The conductive connectors 318 are formed from electrically conductive material. Typically, each conductive trace 316 is electrically connected to a first conductive pad or via 318 at a first end and a second conductive pad or via 318 at a second end.

An exemplary flexible circuit substrate 312 may include a lower insulating layer 314 with the conductive traces 316 and conductive connectors 318 positioned thereon. An upper insulating layer 314 covers at least the conductive traces 316, leaving the conductive connectors 318 exposed. The flexible circuit substrate 312 may include additional layers of conductive traces 316 positioned on additional insulating layers 314 with vias positioned in the insulating layers 314 to electrically connect the conductive traces 316 on one insulating layer 314 to the conductive traces 316 on adjacent insulating layers 314. The flexible circuit substrate 312 may also include conductive planes or passive electronic components, such as resistors, capacitors, and inductors, formed from conductive traces 316.

Referring to step 302, a layer of composite material is trimmed to remove material to create a plurality of openings 320 in alignment with the conductive connectors 318 on the flexible circuit substrate 312 to form a trimmed composite material layer 322. The composite material is of the same type as is used to form the composite material layers 14. The trimmed composite material layer 322 is to cover the flexible circuit substrate 312 in the following step. Thus, a portion of the trimmed composite material layer 322 is cut to remove the material which would have covered the conductive connectors 318. In the exemplary embodiment shown in FIG. 14, a first opening 320 is formed to expose a first set of conductive connectors 318 on the flexible circuit substrate 312, and a second opening 320 is formed to expose a second set of conductive connectors 318.

Referring to step 303, a stack 324 is formed, with the stack 324 including a plurality of composite material layers 14 and the flexible circuit substrate 312 with the composite material layers 14 below the flexible circuit substrate 312 and the trimmed composite material layer 322 above the flexible circuit substrate 312, as shown in FIG. 14.

Referring to step 304, the trimmed composite material layer 322 is aligned to expose the conductive connectors 318 of the flexible circuit substrate 312. The trimmed composite material layer 322 is positioned on top of the stack 324 so that the openings 320 are aligned with the conductive connectors 318 of the flexible circuit substrate 312.

Referring to step 305 and FIG. 11, pressure is applied to the stack 324. The pressure may be applied using traditional techniques. An exemplary technique may include placing the stack 324 on a tool or mold that has an upper surface with a shape for the stack 324 to take, such as flat, contoured, concave, convex, etc. At least one bag or film is placed on top of the stack 324. A vacuum is applied between the bag and the tool, which compresses the stack 324 against the upper surface of the tool. Heat may also be applied to the stack 324. The vacuum is released, the bag is removed, and the aircraft body section 310 is completed.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A multi-layered aircraft body section used to form a portion of an aircraft, the aircraft body section comprising:

a first layer of composite material having unidirectional fibers;

a first group of traces formed on the first layer of composite material, the first group of traces having first length portions, second length portions, and third length portions, the first length portions oriented at a first orientation relative to a direction along which the unidirectional fibers of the first layer of composite material extend, the first length portions having a first trace width, the second length portions oriented at a second orientation relative to the direction along which the unidirectional fibers extend, the second orientation different from the first orientation, the second length portions having a second trace width wider than the first trace width, the third length portions oriented at a third orientation relative to the direction along which the unidirectional fibers extend, the third orientation oriented between the first and second orientations, the third length portions having a third trace width that is wider than the first trace width and narrower than the second trace width;

a second layer of composite material positioned in a stacked configuration with the first layer of composite material; and a first group of vias, the vias electrically coupled to respective traces and positioned within the second layer of composite material.

2. The aircraft body section of claim 1, further including a connector configured to be mounted on the second layer of composite material, the connector including a plurality of pins electrically coupled to respective ones of the vias.

3. The aircraft body section of claim 1, further including additional layers of composite material positioned in the stacked configuration.

4. The aircraft body section of claim 3, further including a layer of resin between the first layer of composite material and at least one of the additional layers.

5. The aircraft body section of claim 3, wherein the stacked configuration includes at least one of the additional composite material layers between the first layer of composite material and the second layer of composite material.

6. The aircraft body section of claim 3, wherein the additional layers include a conductive plane.

7. The aircraft body section of claim 3, further including a second group of vias positioned on at least one of the additional layers, the vias electrically coupled to the first group of traces and the first group of vias.

8. The aircraft body section of claim 1, wherein the second layer of composite material at least partially defines an exterior surface of the aircraft.

9. The aircraft body section of claim 1, wherein the second orientation is perpendicular to the first orientation.

10. An aircraft body section comprising:

a composite material layer, the composite material layer having unidirectional fibers; and a flexible circuit substrate coupled to the composite material layer, the flexible circuit substrate including:
a plurality of traces electrically coupled to a connector, at least one of the traces having first length portions, second length portions, and third length portions, the first length portions oriented at a first orientation relative to a direction along which the unidirectional fibers of the composite material layer extend, the first length portions having a first trace width, the second length portions oriented at a second orientation relative to the direction along which the unidirectional fibers extend, the second orientation different from the first orientation, the second length portions having a second trace width wider than the first trace width, the third length portions oriented at a third orientation relative to the direction along which the unidirectional fibers extend, the third orientation oriented between the first and second orientations, the third length portions having a third trace width that is wider than the first trace width, the third trace width narrower than the second trace width.

11. The aircraft body section of claim 10, wherein the composite material layer unidirectional fibers include glass-based fibers.

12. The aircraft body section of claim 10, wherein the composite material layer unidirectional fibers include carbon-based fibers.

13. The aircraft body section of claim 10, further including:
a stacked configuration including:
a first layer of composite material,
a second layer of composite material, and
at least one additional layer of composite material;
a first group of traces between the first layer of composite material and the second layer of composite material,
a second group of traces electrically coupled to the first group of traces; and
a first group of vias electrically coupled to the first group of traces and located within the second layer of composite material.

14. The aircraft body section of claim 10, wherein the composite material layer further includes an opening aligned with the connector.

15. The aircraft body section of claim 10, wherein the flexible circuit substrate further includes an insulating layer coupled to at least one of the plurality of traces.

16. The aircraft body section of claim 15, wherein the insulating layer is at least partially composed of polyimide.

17. The aircraft body section of claim 10, wherein the flexible circuit substrate further includes a conductive plane electrically coupled to the connector.

* * * * *